United States Patent [19]

Moore et al.

[11] Patent Number: 5,779,266
[45] Date of Patent: Jul. 14, 1998

[54] FLUID FUELED INFLATOR WITH FLOW REVERSAL

[75] Inventors: Walter A. Moore, Ogden; Karl K. Rink, Liberty; Glenn S. Beus, Ogden, all of Utah

[73] Assignee: Morton International, Inc., Chicago, Ill.

[21] Appl. No.: 541,357

[22] Filed: Oct. 10, 1995

[51] Int. Cl.⁶ .................................................. B60R 21/26
[52] U.S. Cl. ........................................ 280/737; 280/741
[58] Field of Search .......................... 280/737, 741, 280/742, 736; 422/164, 165, 166; 102/530, 531; 222/5; 149/87

[56] References Cited

U.S. PATENT DOCUMENTS

| | | | |
|---|---|---|---|
| 3,767,228 | 10/1973 | Lewis | 280/150 |
| 3,817,263 | 6/1974 | Bendler et al. | 137/68 |
| 3,822,895 | 7/1974 | Ochiai | 280/150 |
| 3,862,866 | 1/1975 | Timmerman et al. | 280/741 |
| 3,901,530 | 8/1975 | Radke | 280/150 |
| 3,966,224 | 6/1976 | Campbell et al. | 280/735 |
| 4,104,092 | 8/1978 | Mullay | 149/2 |
| 4,243,248 | 1/1981 | Scholz et al. | 280/735 |
| 4,246,051 | 1/1981 | Garner et al. | 149/7 |
| 4,341,651 | 7/1982 | Beckert et al. | 252/188 |
| 4,561,675 | 12/1985 | Adams et al. | 280/734 |
| 4,620,721 | 11/1986 | Scholz et al. | 280/735 |
| 4,984,651 | 1/1991 | Grösch et al. | 180/268 |
| 5,016,914 | 5/1991 | Faigle et al. | 280/741 |
| 5,022,674 | 6/1991 | Frantom et al. | 280/741 |
| 5,060,973 | 10/1991 | Giovanetti | 280/736 |
| 5,071,160 | 12/1991 | White et al. | 280/735 |
| 5,074,583 | 12/1991 | Fujita et al. | 280/735 |
| 5,225,643 | 7/1993 | Marchant | 200/834 |
| 5,232,243 | 8/1993 | Blackburn et al. | 280/732 |
| 5,263,740 | 11/1993 | Frey et al. | 280/737 |
| 5,290,060 | 3/1994 | Smith | 280/737 |
| 5,296,659 | 3/1994 | Potts et al. | 200/83 |
| 5,301,979 | 4/1994 | Allard | 280/737 |
| 5,330,730 | 7/1994 | Brede et al. | 422/305 |
| 5,344,186 | 9/1994 | Bergerson et al. | 280/741 |
| 5,346,249 | 9/1994 | Hallard et al. | 280/728 |
| 5,348,344 | 9/1994 | Blumenthal et al. | 280/737 |
| 5,350,192 | 9/1994 | Blumenthal | 280/737 |
| 5,351,989 | 10/1994 | Popek et al. | 280/737 |
| 5,356,176 | 10/1994 | Wells | 280/737 |
| 5,360,232 | 11/1994 | Lowe et al. | 280/741 |
| 5,364,127 | 11/1994 | Cuevas | 280/741 |
| 5,388,859 | 2/1995 | Fischer et al. | 280/737 |
| 5,407,226 | 4/1995 | Lauritzen et al. | 280/728 |
| 5,411,289 | 5/1995 | Smith et al. | 280/735 |
| 5,470,104 | 11/1995 | Smith et al. | 280/737 |

FOREIGN PATENT DOCUMENTS

| | | |
|---|---|---|
| 0540013 | 5/1993 | European Pat. Off. |
| 0604001 | 6/1994 | European Pat. Off. |
| 2112006 | 8/1977 | Germany. |
| 4135547 | 4/1993 | Germany. |
| 4135776 | 5/1993 | Germany. |
| 2270742 | 3/1994 | United Kingdom. |

*Primary Examiner*—Paul N. Dickson
*Attorney, Agent, or Firm*—Nick C. Kottis; Gerald K. White

[57] ABSTRACT

An apparatus and method for inflating a vehicular inflatable device adaptable to a variety of fuels and oxidants wherein a fluid fuel is burned to produce hot gas, with the hot gas undergoing a reversal in direction of flow and mixing with stored, pressurized gas to produce inflation gas containing little or no particulate.

29 Claims, 7 Drawing Sheets

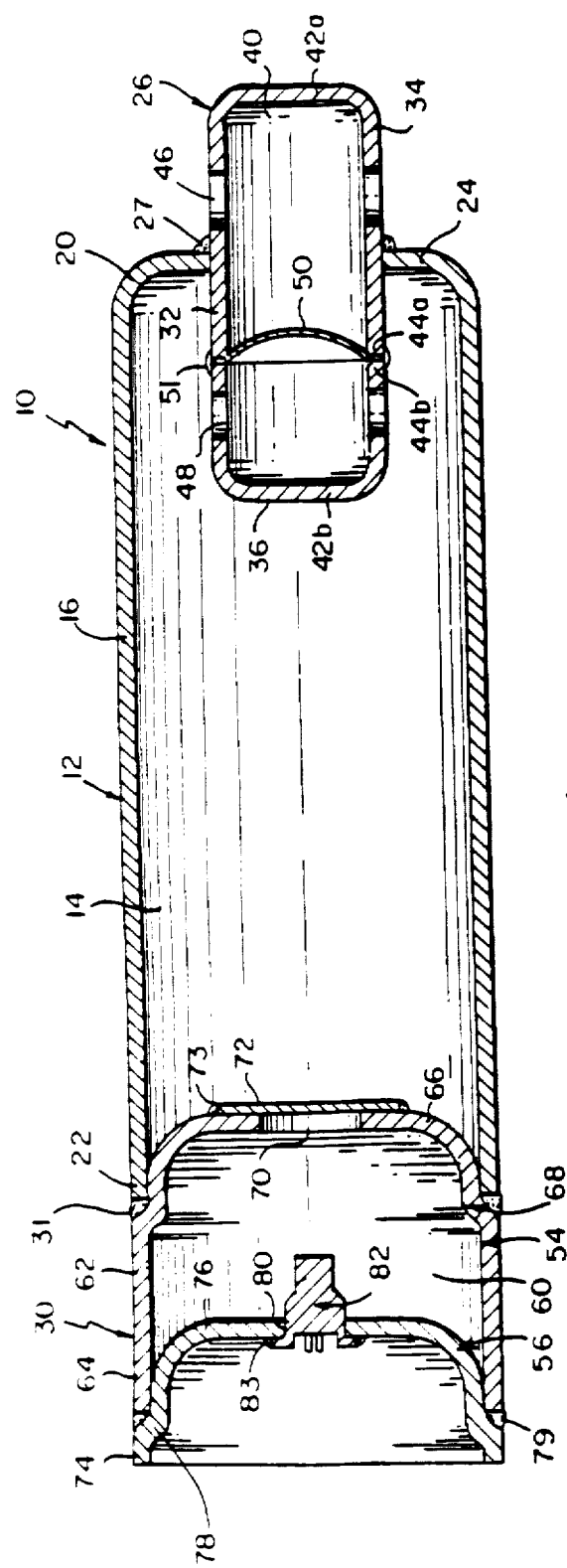
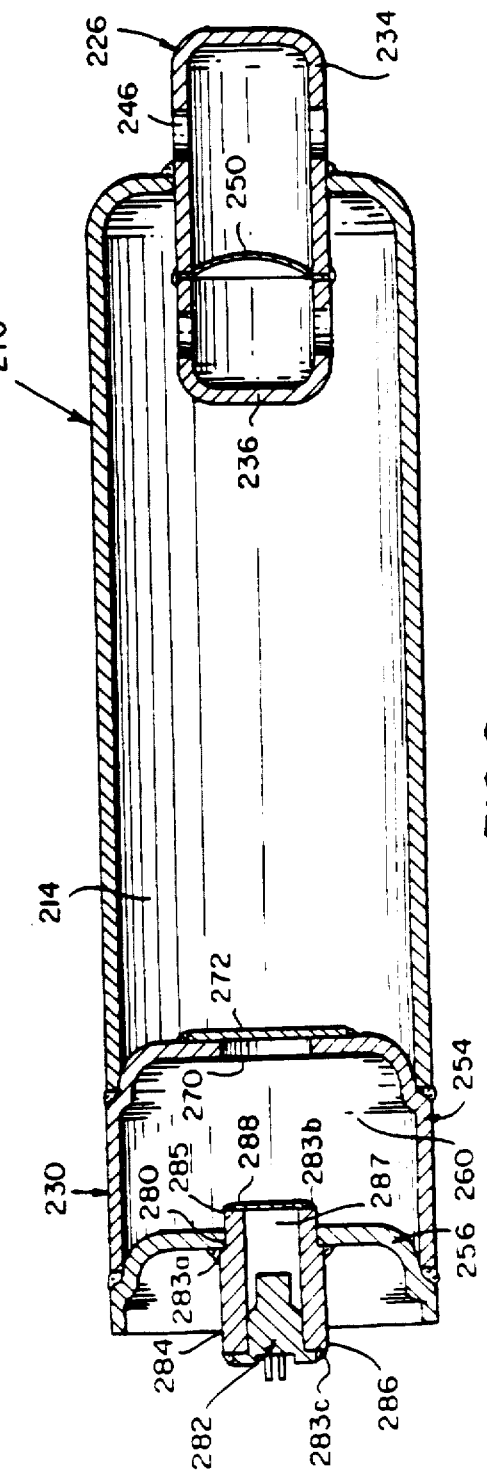

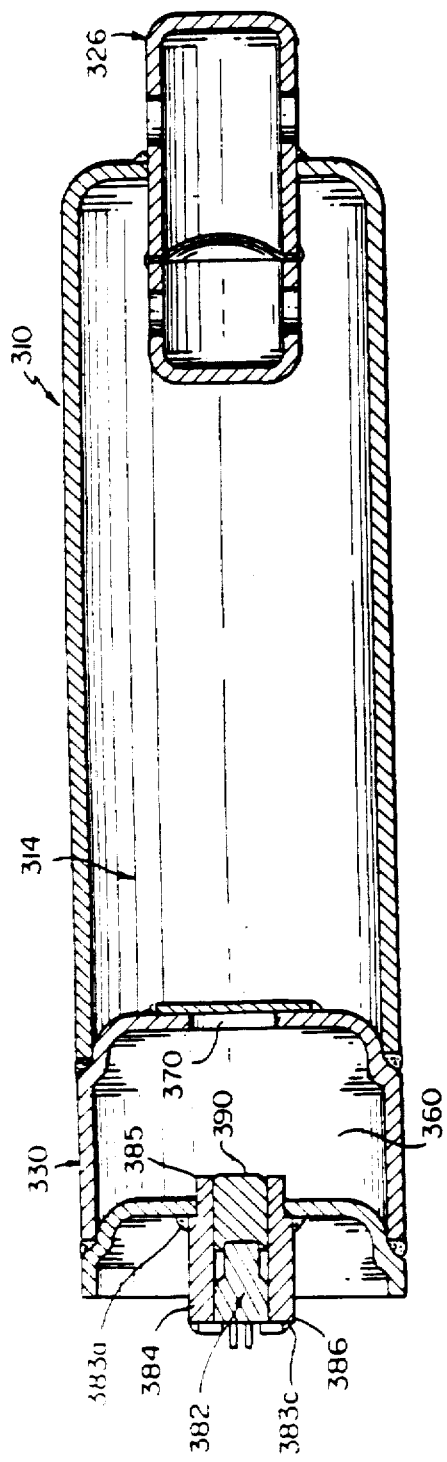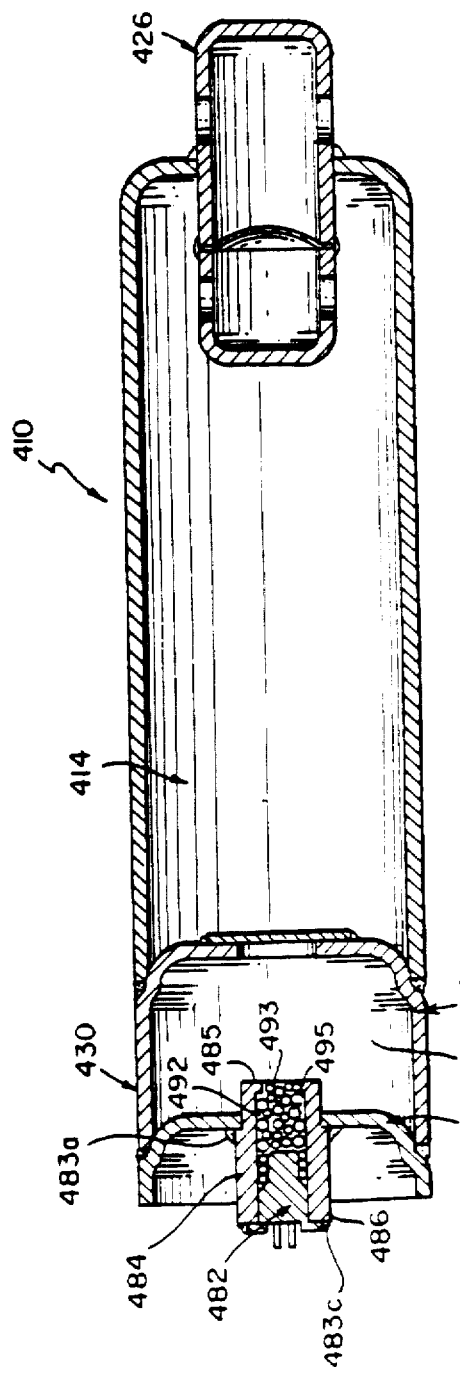

FLUID FUELED INFLATOR WITH FLOW REVERSAL

BACKGROUND OF THE INVENTION

This invention relates generally to inflatable restraint systems and, more particularly, to an apparatus, commonly referred to as an inflator, for inflating an inflatable device such as an inflatable vehicle occupant restraint for use in such systems.

Many types of inflator devices have been disclosed in the art for inflating an airbag for use in an inflatable restraint system. One type of inflator device involves the utilization of a quantity of stored compressed gas which is selectively released to inflate the airbag. To properly inflate a typical airbag at an appropriate rate, such a type of device commonly requires the storage of a relatively large volume of gas at relatively high pressures. As a result of the high pressures, the walls of the gas storage chamber are typically relatively thick for increased strength. The combination large volume and thick walls results in relatively heavy and bulky inflator designs. In addition, a technique designed to initiate the release of the stored gas into the airbag must be devised.

Another type of inflator device derives a gas source from a combustible gas generating material, e.g., a pyrotechnic. This material, upon ignition, generates a quantity of gas sufficient to inflate the airbag. Typically, such gas generating materials can produce various undesirable combustion products, including various solid particulate materials. The removal of such solid particulate material, such as by the incorporation of a filtering device within or about the inflator, undesirably increases inflator design and processing complexity and can increase the costs associated therewith.

In addition, the temperature of the gaseous emission of such inflator devices can typically vary between about 500° F. (260° C.) and 1200° F. (649° C.), dependent upon numerous interrelated factors including the desired level of inflator performance, as well as the type and amount of gas generant used therein, for example. Consequently, airbags used in conjunction with such inflator devices typically are constructed of or coated with a material resistant to such high temperatures. For example, an airbag such as constructed of nylon fabric, in order to resist burn-through as a result of exposure to such high temperatures, can be prepared such that the nylon fabric airbag material is coated with neoprene or one or more neoprene coated nylon patches are placed at the locations of the airbag at which the hot gas initially impinges. As will be appreciated, such specially fabricated or prepared airbags typically are more costly to manufacture and produce.

Further, while vehicular inflatable restraint systems are preferably designed to be properly operational over a broad range of conditions, the performance of such inflator device designs can be particularly sensitive to changes in the ambient conditions, especially temperature. For example, operation at very low temperatures, such as temperatures of −40° F. (−40° C.), can affect the performance of various propellants, and thus lower airbag pressure resulting from an inflator which contains a fixed available amount of propellant.

In a third type of inflator device, airbag inflating gas results from a combination of stored compressed gas and combustion of a gas generating material. This type of inflator device is commonly referred to as an augmented gas or hybrid inflator. Hybrid inflators that have been proposed heretofore are subject to certain disadvantages. For example, inflator devices of such design typically result in a gas having a relatively high particulate content.

Various specific inflator devices and assemblies have been proposed in the prior art. U.S. Pat. No. 5,263,740 discloses an assembly wherein within a single chamber is housed both an inflation gas and a first ignitable material, which is subsequently ignited therein.

The housing of both an inflation gas and an ignitable material within a single chamber can result in production and storage difficulties. For example, concentration gradients of such components, both initially and over time as the device awaits actuation, can increase the potential for the release therefrom of ignitable material into the airbag prior to complete ignition, as well as increasing the relative amount of incomplete products of combustion released into the airbag.

Also, gas generators wherein, for example, a fuel and an oxidant are stored in a single chamber, can under certain extreme circumstances be subject to autoignition (i.e., self-ignition) and the consequent dangers that may be associated therewith, both during manufacture and storage.

Further, as the gas mixture resulting from such a single storage chamber assembly will typically be at a relatively high temperature, such designs can be subject to the same or similar shortcomings identified above associated with high temperature emissions.

In addition, as a result of the rapid pressure and temperature rises normally associated with inflator devices which house a mixture of oxidant and ignitable material, proper and desired control and operation of such inflator devices can be difficult and/or complicated.

Thus, there is a need and a demand for improvement in airbag inflators to the end of overcoming the foregoing disadvantages. More particularly, there is a need for the provision of airbag inflation gas at a relatively low temperature and having a relatively low concentration of undesirable combustion products, especially particulate matter. Further, there is a need for an inflator device of simple design and construction which device is effectively operable using a variety of fuels, oxidants, and stored gases. In addition, there is a need for an inflator design that reduces or eliminates the potential of undesired autoignition of an inflation gas/ignitable material mixture. Still further, there is a need for the provision of airbag inflation gas containing no more than limited amounts of oxygen gas and moisture, thereby avoiding or minimizing the problems associated therewith. Yet still further, there is a need for an inflation device that minimizes or avoids the undesirable introduction of combustible mixtures into the airbag upon inflation.

In addition, there is a need for an inflator assembly design that safely provides greater design and manufacturing flexibility.

Additionally, there is a need for an inflator assembly design which provides greater operational flexibility, better permitting a particular inflator to be designed to meet the specific inflation gas needs in particular vehicular applications. Further, there is a need for an inflator of a design which can be assembled more simply, easily and less costly. Still further, there is a need for an inflator assembly design that provides improved contact and mixing by and between generated gas and stored gas, such as resulting in improved heat transfer therebetween. There is also a need for an inflator assembly that facilitates the incorporation and integration of design features such as, for example, a low pressure sensing device.

The present invention was devised to fill the gap that has existed in the art in certain of these respects.

SUMMARY OF THE INVENTION

A general object of the invention is to provide an improved apparatus for inflating an inflatable device.

A more specific objective of the invention is to overcome one or more of the problems described above.

The general object of the invention can be attained, at least in part, through a specified apparatus for inflating an inflatable device. The apparatus includes a housing which includes a first chamber and a second chamber. In the first chamber, at least one fuel in the form of a fluid and at least one oxidant are burned to produce combustion products including hot combustion gas. The first chamber is adapted to open when a predetermined increase in pressure within the first chamber is realized, whereby at least a portion of the hot combustion gas is expelled from the first chamber.

The apparatus also includes initiator means for initiating the burning of the at least one fuel in the form of a fluid and at least one oxidant in the first chamber.

The second chamber of the housing contains a supply of pressurized stored gas. The second chamber is in fluid communication with the first chamber upon the opening of the first chamber with the hot combustion gas expelled from the first chamber mixing with the pressurized stored gas to produce inflation gas. The second chamber is adapted to open when a predetermined increase in pressure within the second chamber is realized after the hot combustion gas expelled from the first chamber mixes with the pressurized stored gas to produce the inflation gas, whereby at least a portion of the inflation gas is expelled from the second chamber in a second direction.

The prior art fails to provide as great as desirable degree of freedom and flexibility in design, as desired, in order to facilitate the designing of a particular inflator to meet various specific inflation gas needs for particular vehicular applications. Further, the prior art fails to provide a inflator of reduced design and assembly complexity having as complete as desired contact and mixing by and between generated gas and stored gas without significantly detrimentally impacting inflator performance.

As described herein, however, the invention can result in simplified, improved, and/or varied operation, as well as increased safety.

The invention further comprehends an apparatus for inflating an inflatable device wherein the apparatus includes an elongated tubular housing which includes a first chamber and a second chamber.

Specifically, the housing includes first and second end portions, with the first end portion closed by means of a first end closure and the second end portion closed by means of a second end closure.

The first chamber is formed at least in part by a wall and is along at least a first section of the second end closure. At least one fuel in the form of a fluid and at least one oxidant are burned in the first chamber to produce combustion products including hot combustion gas. The combustion of the fuel in the form of a fluid and the oxidant increases the temperature and pressure within the first chamber with the first chamber adapted to open when a predetermined increase in pressure within the first chamber is realized, whereby at least a portion of the hot combustion gas is expelled from the first chamber in a direction opposite the first section of the second end closure.

The apparatus also includes initiator means for initiating the burning of the at least one fuel in the form of a fluid and at least one oxidant in the first chamber.

The second chamber of the housing is along at least a second section of the second end closure. The second chamber includes at least one outlet opening at the second section of the second end closure and has sealing means normally closing the at least one outlet opening. The second chamber contains a supply of pressurized stored gas and is in fluid communication with the first chamber upon the opening of the first chamber. The hot combustion gas expelled from the first chamber mixes with the pressurized stored gas to produce inflation gas substantially free of solid particulate material. The mixing of the hot combustion gas with the pressurized stored gas increases the temperature and pressure within the second chamber with the second chamber sealing means adapted to open when a predetermined increase in pressure within the second chamber is realized after the hot combustion gas expelled from the first chamber mixes with the pressurized stored gas to produce the inflation gas. Upon the opening of the second chamber sealing means, at least a portion of the inflation gas is expelled from the second chamber through the at least one outlet opening.

The apparatus also includes directing means for directing the expelled second chamber contents to the inflatable device.

The invention still further comprehends a method for inflating an inflatable safety device in a vehicle. The method involves the steps of:

burning at least one fuel in the form of a fluid with at least one oxidant in a first sealed chamber to produce combustion products including hot combustion gas and thereby increasing the temperature and pressure within the first chamber;

opening the first chamber when a predetermined increase in the pressure within the first chamber is realized to expel at least a portion of the hot combustion gas from the first chamber into a second chamber containing a supply of pressurized stored gas;

mixing the expelled hot combustion gas with the pressurized stored gas in the second chamber to produce inflation gas, the mixing increasing the temperature and pressure within the second chamber, and opening the second chamber when a predetermined increase in the pressure within the second chamber is realized to expel the inflation gas from the second chamber to inflate the inflatable safety device;

wherein the hot combustion gas expelled from the first chamber and mixing with the pressurized stored gas to produce the inflation gas in the second chamber undergoes a reversal of direction between exiting the first chamber and exiting the second chamber.

As used herein, references to a chamber or volume as being "free of combustion oxidant" are to be understood to refer to a chamber or volume sufficiently free of oxidant such that, over the range of pressures and temperatures experienced during the storage of the fluid fuel therein, the amount of heat liberated by chemical reaction (since the chemical reaction rate is non-zero for all temperatures) is less than the amount of heat dissipated to the surroundings. It will be appreciated that as the rate of such chemical reaction (and hence the amount of heat liberated upon reaction) is dependent on the concentration of oxidant as well as the temperature, the amount of heat liberated can be minimized through proper control of the quantity of oxidant initially present therein.

The term "equivalence ratio" ($\phi$) is commonly used in reference to combustion processes. Equivalence ratio is defined as the ratio of the actual fuel to oxidant ratio $(F/O)_A$ divided by the stoichiometric fuel to oxidant ratio $(F/O)_s$:

$\phi = (F/O)_A/(F/O)_s$ (A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.) In general, for given temperature and pressure conditions, fuel and oxidant mixtures are flammable over only a specific range of equivalence ratios.

The term "counterflow" is used herein consistently with the extensive use of such term in the combustion sciences to denote situations when the bulk portions of two flow streams, such as of gas, flow substantially along the same axis but in opposite directions along such same axis.

As used herein, reference to an inflator or the like apparatus for inflating an inflatable device as being or producing inflation gas "free of solid particulate" is understood to refer to an apparatus for which, after combustion, generally no more than about 20% of the original combustible material remains as residual solid, including airborne solids.

Other objects and advantages will be apparent to those skilled in the art from the following detailed description taken in conjunction with the appended claims and drawings.

BRIEF DESCRIPTION OF THE DRAWINGS

Each of FIGS. 1-4 are simplified, partially in section schematic drawings of fluid fueled inflators in accordance with alternative embodiments of the invention.

Each of FIGS. 5A, 5B, and 5C are simplified schematic drawings of alternative initiator devices for use in a fluid fueled inflator in accordance with the invention.

DETAILED DESCRIPTION OF THE INVENTION

Figure 5C:
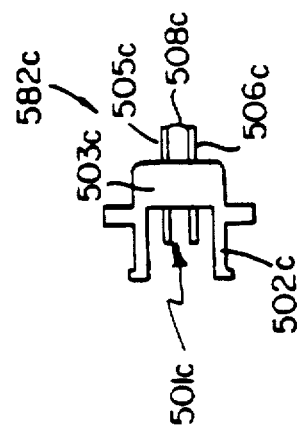

Referring initially to FIG. 1, there is illustrated a fluid fueled inflator assembly 10 for inflating a vehicle occupant restraint, such as an airbag. It will be understood that the invention described hereinafter has general applicability to various types or kinds of airbag assemblies including driver side, passenger side, and side impact airbag assemblies for automotive vehicles including vans, pick-up trucks, and particularly automobiles.

The inflator assembly 10 comprises a pressure vessel 12 including a storage chamber 14 that is filled and pressurized with an inert gas such as argon or nitrogen to a pressure typically in the range of 2000–4000 psi.

The chamber 14 is defined by an elongated generally cylindrical sleeve 16, having a first and a second end, 20 and 22, respectively. The first end 20 is partially closed by means of an integral shoulder portion 24. A diffuser assembly 26 is attached by a circumferential weld 27 in sealing relation to the sleeve first end 20. A combustion chamber assembly 30 is attached by a circumferential weld 31 in sealing relation to the sleeve second end 22.

The diffuser assembly 26 comprises a generally cylindrical sleeve 32 having a cap portion 34 and a base portion 36 to define a diffusion chamber 40. Each of the diffuser assembly cap and base portions, 34 and 36, respectively, include a closed first end 42a and 42b, respectively, and an open second end 44a and 44b, respectively. The diffuser assembly cap portion 34 includes a plurality of openings 46, adjacent the closed cap first end 42a, for dispensing inflation gas from the inflator assembly into an airbag assembly (not shown). The diffuser assembly base portion 36 additionally includes a plurality of openings 48, adjacent the closed base first end 42b, for passage of inflation gas from the storage chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the storage chamber 14 from the airbag.

The combustion chamber assembly 30 comprises a cap portion 54 and a base portion 56 to define a combustion chamber 60. Within the combustion chamber 60 is stored one or more fluid fuels and one or more oxidants, forming a flammable mixture. In practice of this aspect of the invention, the one or more fuels and one or more oxidants are together such as in intimate contact and at relatively high pressure (e.g., about 500 to 2500 psi (3.4 to 17.2 MPa), typically preferably greater than about 1200 psi (8.3 MPa) and, more preferably, between about 1600 and 2100 psi (11 to 14.5 MPa)). As with the gas stored in the storage chamber 14, storage of gas within the combustion chamber 60 at relatively high pressures advantageously helps minimize the overall size of the inflator and can minimize ignition delay, thereby resulting in higher and faster performance by the inflator assembly, and can result in more complete combustion of the fuel material, such as through increased temperature and, hence, reaction rates. In addition, such an inflator assembly results in reduced or no emission of incomplete products of combustion.

The combustion chamber cap portion 54 includes a sleeve 62, constituting a side wall 64 with a dome 66 joined thereto via a cap shoulder connecting portion 68. The combustion chamber dome 66 includes an orifice, referred to herein as a gas exit opening 70. The gas exit opening 70 is normally closed by sealing means, e.g., by means of a rupture disc 72 joined in sealing relation with the combustion chamber dome 66 by means of a circumferential weld 73 at the periphery of the disc 72.

The combustion chamber dome 66 is generally designed to withstand the internal pressures generated upon the combustion of the flammable mixture within the combustion chamber 60. In the static state, the disc serves in maintaining the gas storage chamber 14 in a sealed condition.

The combustion chamber base portion 56 includes a base ring 74 with a base cap 76 joined thereto via a base shoulder connecting portion 78. The base shoulder connecting portion 78 serves as a convenient means of locating the combustion chamber base portion 56 relative to the combustion chamber sleeve 62, as well as providing a location for a circumferential weld 79 whereby the combustion chamber assembly base portion 56 is attached in sealing relation to the combustion chamber cap portion 54.

The base cap 76 includes an opening 80 therein, wherethrough an initiator device 82, such as described in greater detail below, is attached in sealing relation within the combustion chamber 60 as with a weld 83, crimping or other suitable hermetic seal.

In operation, such as upon the sensing of a collision, an electrical signal is sent to the initiator device 82. As will be described in greater detail below, the initiator device will in the appropriate selected manner initiate the combustion of the fluid fuel and oxidant mixture housed within the combustion chamber 60.

The hot gas produced upon the burning of the flammable mixture results in a rapid pressure rise within the combustion chamber 60. When the gas pressure within the combustion chamber 60 exceeds the structural capability of the rupture disc 72, the disc ruptures or otherwise permits the passage of the hot gas through the gas exit opening 70 and into the storage chamber 14. Wherein, the hot combustion gas expelled from the combustion chamber 60 mixes with the pressurized gas stored within the separate storage chamber 14 to produce inflation gas for use in inflating the inflatable restraint device, e.g., an airbag. It will be appreciated that augmenting the combustion gas with the stored inert gas produces an inflation gas having both a lower temperature and reduced byproduct concentration (e.g., CO, $NO_x$, $H_2O$, etc.) than the combustion gas alone.

When the gas pressure within the storage chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the airbag assembly.

The fluid fuels useable in such an apparatus include a wide range of gases, vapors, finely divided solids and liquids such that, when used with one or more suitable oxidants in proper proportion(s) at selected conditions (either alone or in conjunction with one or more inert gases) form a flammable mixture.

Such fluid fuels include hydrogen, as well as hydrocarbon-based fuels such as hydrocarbon and hydrocarbon derivative fuels. For example, such hydrocarbon fuels include those constituting naphthenic, olefinic and paraffinic hydrocarbon groups, particularly $C_1$–$C_4$ paraffinic hydrocarbon fuels. Suitable fuels that can be used in the practice of the invention include, for example; gasoline, kerosene, and octane. In addition, hydrocarbon derivative fuels such as those constituting various alcohols, ethers, and esters, for example, particularly those containing four or fewer carbon atoms and, in particular, alcohols such as ethyl and propyl alcohol can advantageously be used in the practice of the invention.

In general, the finely divided solid fuels useable in the practice of the invention must be of sufficient energy content and reactivity to heat the volume of stored gas to inflate the inflatable restraint device at the desired rate, without the inflator device being of an undesirable large size. Additionally, the fuel desirably produces no more than acceptable levels of combustion products, such as CO, NO, HCN, or $NH_3$, for example, which are or become toxic at sufficiently high concentrations.

The finely divided solid fuel useable in the practice of the invention can include one or more various powders or dusts such as those of:

a) carbonaceous materials such as coal and coal products (e.g., anthracite, bituminous, sub-bituminous, etc., such as with various volatile contents), charcoal, oil shale dust, and coke;

b) cottons, woods, and peat (such as various cellulosic materials including, for example: cellulose acetate, methylcellulose, ethylcellulose, and cellulose nitrate, as well as wood and paper dusts);

c) food feeds (such as flours, starches and grain dusts);

d) plastics, rubbers, and resins (such as epoxies, polyesters and polyethylenes); and e) metal and metal alloy materials (e.g., aluminum, magnesium, titanium, etc., as powders, grits, and/or shavings, in pure or compound form).

It is to be understood that such fuel can, if desired, be held in combinations with varying contents of liquid, vapor and combinations thereof of water.

Further, it will be appreciated that the finely divided solid fuels useable in the practice of the invention will typically include solid particles of varying size and shape. In general, however, the particle size of such finely divided solid fuel will typically vary in a range between about 5 to 500 microns and preferably in a range of about 10 to 125 microns, with mean particle sizes in the range of 10 to 40 microns. In practice, such sized finely divided solid fuels can desirably result in rapid and complete combustion, reducing or even eliminating the need for filtration of particulate from the corresponding inflator assembly design.

The use of finely divided solid fuels can result in various processing advantages. For example, such solid fuels, at least as compared relative to gaseous or liquid fuels, can simplify handling requirements and facilitate storage within an appropriate fuel storage chamber. Such facilitation in handling can, in turn, result in manufacturing cost reductions.

It will be appreciated that the fuel material, particularly fuel materials such as liquid hydrocarbons and liquid hydrocarbon derivatives (e.g., alcohols) may include therewith, in limited proportions, materials such as water that are normally not considered to be fuels. This is particularly true for those fuel materials for which complete water separation is not normally practically realizable. Additionally, the presence of water in minor amounts, e.g., less than about 10 vol %, typically between about 4–8 vol %, can beneficially reduce the possibility of undesired autoignition of the inflator assembly without significantly affecting the low temperature performance of the assembly.

It is also to be appreciated that various fuel materials can, if desired, be used mixed together. This is particularly true for those fuel materials, such as commercial grade butane, for which complete separation is not normally practically realizable. For example, fuel mixtures which have been used include: a) an alcohol mix containing about 80% ethyl alcohol, 8–10% methyl alcohol, and 4–8% water, with the balance constituting other various hydrocarbon species and b) an alkane mix containing about 90+% (e.g. about 95%) butane, 2–6% (e.g., about 4%) propane and with the balance constituting methane, ethane and other various trace hydrocarbon species. One example of such fuel material is the denatured ethanol, "ANHYDROL SOLVENT SPECIAL, PM-4083, 200 Proof", sold by Union Carbide Chemicals and Plastics Company Inc. and containing 85.8% ethanol, 13.3% methanol and 0.9% methyl isobutyl ketone.

Further, such fuels can be used in multi-phase combinations of two or more of the fuels in different states (e.g. gas, liquid, and solid). For example, the fluid fuel used can constitute a combination or mixture of a finely divided solid fuel in a liquid fuel, such as a starch in ethyl alcohol, for example. Similarly, the fluid fuel can constitute a combination or mixture of a gaseous fuel held in intimate contact with a liquid fuel. For example, such a gaseous fuel could be held in contact with the liquid fuel under pressure, similar in fashion to a carbonated beverage held in a container.

Oxidants useable in the invention include various oxygen-containing gases including, for example, pure oxygen, air, diluted air, and oxygen combined with one or more gas diluents such as nitrogen, carbon dioxide, and noble gases such as helium, argon, xenon. In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \leq 1.2$), extremely high flame temperatures can result (especially at the elevated pressures commonly associated with such inflator designs, and 4) at equivalence ratios of less than 0.8, excess quantities of oxygen and carbon monoxide can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being argon can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

Further, with respect to oxidants used in conjunction with a finely divided solid fuel, while the above-described oxidants are useable therewith, an enriched-oxygen mixture at elevated pressures is believed preferred.

It is to be understood that reference to a mixture as having "enriched-oxygen" is relative to a mixture having an oxygen concentration similar to that of air. Thus, mixtures containing greater than about 21% oxygen are herein considered "enriched-oxygen" mixtures.

In the practice of the invention, such enriched-oxygen oxidant mixtures will generally be of a pressure in the range of about 500 to about 3000 psia (about 3.45 to about 20.7 MPa), preferably in the range of about 1000 to about 2000 psia (about 6.9 to about 13.8 MPa). Further, as described above, the oxygen can be mixed with an inert gas. In addition, the use of an oxidant mixture containing about 35 to 65% oxygen, about 2 to 20% helium, and with the balance constituting one or more inert gas (such as helium, argon, and nitrogen), either alone or in various relative amounts can be advantageous. It will be appreciated by those skilled in the art that the relative amounts of these components, especially the amount of helium, can be appropriately varied for specific inflator designs. For example, an oxidant mixture of about 60% oxygen, about 25% argon and about 15% helium can result in improved hot, cold and/or ignition delay performance as well as facilitate, during the manufacturing process, the detection of leaks from the device.

Thus, the invention permits the use of a wide range of fuels in a variety of forms (including gaseous, liquid, and solid, as well as mixtures thereof, including multi-phase combinations of two or more fuel materials) and a wide variety of oxidant species, and also a wide range of relative amounts of fuel and oxidant species.

In general, the inflator assemblies of the invention are preferably operated with equivalence ratios in the range of $0.4 \leq \phi \leq 1.6$, preferably in the range of $0.5 \leq \phi \leq 0.8$.

FIGS. 2 and 3 illustrate fluid fueled inflator assemblies 210 and 310, respectively, similar to the inflator assembly 10 described above and each having a storage chamber, e.g., 214 and 314, respectively, a diffuser assembly, e.g., 226 and 326, respectively, and a combustion chamber assembly, e.g., 230 and 330, respectively.

The fluid fueled inflator assemblies 210 and 310, however, differ from the inflator assembly 10 in that each of these assemblies, as described in greater detail below, include a separate fluid fuel storage element to store fluid fuel free of combustion oxidant, such as may be desired to facilitate the long term storage, e.g., such as storage for 10 to 15 or more years.

Specifically, as shown in FIG. 2, the combustion chamber assembly 230 of the fluid fueled inflator assembly 210 though also including similar combustion chamber assembly cap and base portions, 254 and 256, respectively, includes an annular cylindrical wall 284, having a first and a second end, 285 and 286, respectively, and defining a fuel chamber 287. The wall 284 is attached in sealing relation within the combustion chamber 260 via a weld 283a at the base cap opening 280. The first end 285 is normally closed by means of a rupture disc 288 joined in sealing relation therewith as with a circumferential weld 283b at the periphery of the disc 288. To the second end 286 is attached, in sealing relation as with a weld 283c, an initiator device 282. Within the fuel chamber 287 is stored the fluid fuel, separate and apart from the oxidant which is stored within the combustion chamber.

In the operation of such an assembly, such as upon the sensing of a collision, an electrical signal is sent to the initiator device 282. In such an assembly, the initiator device will preferably be of a pyrotechnic type.

As will be described in greater detail below, pyrotechnic initiator devices can: 1) advantageously provide sufficient energy output to rupture the separation means separating the fuel from the oxidant, 2) adequately disperse and vaporize the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge into the fuel storage chamber 287. In turn, the temperature and pressure of the fuel stored within the fuel storage chamber 287 will increase.

When the structural capability of the rupture disc 288 is exceeded such as by pressure and/or heat, the disc ruptures or otherwise permits the passage of the hot fuel through the first end 285 and into the combustion chamber 260. In the combustion chamber 260, the hot fuel mixes with oxidant and ignites and burns at an elevated temperature and pressure.

When the gas pressure within the combustion chamber 260 exceeds the structural capability of the rupture disc 272, the disc ruptures or otherwise permits the passage of the hot gas through the gas exit opening 270 and into the storage chamber 214. Wherein, the hot combustion gas expelled from the combustion chamber 260 mixes with the pressurized gas stored within the storage chamber 214 to produce inflation gas for use in inflating the inflatable device, e.g., an airbag.

When the gas pressure within the storage chamber 214 exceeds the structural capability of the rupture disc 250, the disc ruptures or otherwise permits the passage of the inflation gas through the diffuser base portion 236 and into the diffuser cap portion 234 and thus allows this inflation gas to vent through the openings 246 into the airbag assembly.

FIG. 3 illustrates a fluid fueled inflator assembly wherein the fluid fuel is stored in a separate fluid fuel storage element, free of combustion oxidant, in accordance with an alterative embodiment of the invention.

The fluid fueled inflator assembly 310, shown in FIG. 3, is similar to the inflator assembly 210 described above but, rather than including a fixed wall fuel storage element sealed, for example, by means of a rupture disc, includes a rupturable flexible wall bladder 390 contained within the combustion chamber 360, in close proximity to the initiator device 382.

As shown, the bladder 390 can be fitted within an annular cylindrical wall 384, having a first and a second end, 385 and 386, respectively. Similar to the assembly 210 of FIG. 2, the wall 384 is attached in sealing relation within the combustion chamber 360 via a weld 383a at the base cap opening 380. Similarly, an initiator device 382 is attached, in sealing relation via a weld 383c, to the second end 386. The first end 385, however, can be maintained in an open state as the fuel bladder 390 is fitted within the annular opening of the wall 384, adjacent the discharge end of the initiator device 382.

The bladder 390 preferably is formed of a material sufficiently impervious to the fluid fuel stored therein to prevent undesired mixing of the fuel with the oxidant stored in the adjacent or surrounding combustion chamber 360. In such an assembly and by way of the described use of a fuel bladder, fluid fuel is stored free of combustion oxidant.

In the operation of such an assembly, such as upon the sensing of a collision, an electrical signal is sent to the initiator device 382. In such an assembly, the initiator device will also preferably be of a pyrotechnic type. Again in such an assembly, pyrotechnic initiator devices can: 1) advantageously provide sufficient energy, e.g., heat, output to rupture the flexible wall bladder, 2) adequately disperse the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge at the surface of the adjacent fuel bladder, resulting in the piercing or otherwise opening of the bladder 390 and the consequent mixing of fuel therefrom with oxidant stored in the combustion chamber 360. That is, the fuel is dispersed into the oxidant and vaporized as a result of the energy output of the initiator device. In turn, residual heat and hot radiant particles issuing forth from the initiator device provide an effective ignition source. The mix of fuel and oxidant then ignites and burns.

As with the above-described embodiments, the hot gas produced upon the burning of the flammable mixture results in a rapid pressure rise within the combustion chamber 360, with the subsequent passage of hot gas through the gas exit opening 370 and into the storage chamber 314. Wherein, the hot combustion gas expelled from the combustion chamber 360 mixes with the pressurized gas stored within the storage chamber 314 to produce inflation gas for use in inflating the inflatable device, e.g., an airbag, in a manner similar to that described above relative to the embodiments illustrated in FIGS. 1 and 2.

It will be appreciated that by appropriately filling the bladder with fuel prior to placement of the bladder within the combustion chamber, e.g., prior to addition of oxidant in the combustion chamber, and subsequently filling the combustion chamber with oxidant at the selected pressure, the filling process is rendered relatively safe and easy.

It is also to be understood that similar fuel-containing bladder inflator assembly designs can be utilized in applications wherein only short term separation of fuel and oxidant is required or desired. For example, such a fuel-containing flexible wall bladder can be used to keep fuel and oxidant separate during the loading and/or sealing (e.g., welding) operations associated with the fabrication of such inflator assemblies, e.g., the loading and sealing of the oxidant chamber which houses the fuel-containing bladder. After such loading and/or sealing it may no longer be necessary or desirable to maintain such separation between the fuel and oxidant. It will be appreciated that in general the structural integrity of the bladder material need not be as great where only a relatively short term separation of fuel and oxidant is required or desired, e.g., the material forming the bladder need only be sufficiently impervious to the fuel to prevent such undesired mixing for a relatively short period of time.

In general, the fluid fuels useable in such assemblies wherein fluid fuel is stored in a storage element free of combustion oxidant can be the same as those described above and including, as described below, various gaseous, liquified gases, liquid fuels, finely divided solids and multi-phase combinations of two or more thereof.

As described above, in order to reduce the overall size of the inflator assembly and to satisfy performance criteria, oxidants are stored at relatively high pressures. In turn, relative to the use of gaseous fuels, it may be preferred that the gaseous fuel be stored at pressures in the same general range, e.g., nearly equal, as the pressure at which the oxidant is stored. It will be appreciated that as the inflator assembly designs of the invention generally rely on the initiator supplying sufficient energy to effect breaking, burning through, or rupturing of the separation barrier between the fuel and the oxidant, e.g., a rupture disc or fuel bladder wall, storage of gaseous fuels and oxidants at near equal pressures avoids the need for a separation barrier of greater thickness or strength, as would typically be required if the barrier would be required to withstand a large pressure differential for a prolonged period of time. As most potential gaseous fuels normally liquify at such relatively high pressures, preferred gaseous fuels for use in assemblies of the invention wherein fluid fuel is stored in a storage element free of combustion oxidant include hydrogen and methane.

With respect to liquified gas fuels, a factor in the selection of an appropriate fuel material is the liquid-phase expansion characteristics of the material. In general, the fuel material will be selected and the fuel storage element filled sufficiently, such that for designed increases in ambient temperature, such as for abnormal storage at temperatures as high as about 230° F. (110° C.), the fuel storage element will not reach a state where the storage element is completely filled with liquid. With such a storage element nearly completely filled with liquid, upon the subsequent additional heat and mass input such as from an initiator, the liquid within the storage element will have little or no volume available for expansion. Thus, with such additional heat and mass input, the pressure within the storage element will increase and desirably result in the breaking or rupturing of the separation element. In practice, the separation element for use in this aspect of the invention need be sufficiently strong and durable to withstand fatigue such as caused by the expansion and compression of the material stored within the storage element normally associated with and resulting from changes in ambient conditions.

It is to be understood that the designed increase in ambient temperature (e.g., the maximum design ambient temperature can be higher or lower) as well as the strength of the corresponding separation element can be appropriately altered to satisfy the needs for particular applications. For example, in at least some inflator assembly designs it may be desirable that the fuel storage element be filled sufficiently with fuel such that the fuel storage element will reach the state where the storage element is completely filled with liquid at a lower maximum design ambient temperature, e.g., a temperature less than about 230° F. (110° C.).

Liquified gases for use in the practice of the invention can include ethane, propane, butane and various mixtures of these and other appropriate gases.

With respect to the use of liquid fuels in such designs wherein the fuel is stored separately from the oxidant, liquid fuels such as those identified above with respect to assemblies wherein fuel and oxidant are stored in a mixed or non-separated condition including ethyl alcohol, can be used.

FIG. 4 illustrates a fluid fueled inflator assembly 410 in accordance with yet another alternative embodiment of the invention.

The fluid fueled inflator assembly 410, similar to the inflator assembly 10 described above, includes a storage chamber 414, a diffuser assembly 426, and a combustion chamber assembly 430.

The fluid fueled inflator assembly 410, however, differs from the inflator assembly 10 in that, as described in greater detail below, the assembly 410 includes and utilizes a source of supplemental fuel.

Specifically, as shown in FIG. 4, the combustion chamber assembly 430 though also including similar combustion chamber assembly cap and base portions, 454 and 456, respectively, includes an annular cylindrical wall 484, having a first and a second end, 485 and 486, respectively, and defining a supplemental fuel source storage chamber 492, wherein is normally stored or housed a supplemental fuel source charge 493 in close proximity to the initiator device 482, that is adjacent the discharge portion of the initiator device.

The wall 484 is attached in sealing relation within the combustion chamber 460 via a weld 483a at the base cap opening 480. The first end 485 includes a chamber lip 495 to assist in maintaining the supplemental fuel source charge 493 within the chamber 492. To the second end 486 is attached, in sealing relation via a weld 483c, an initiator device 482, such as described in greater detail below.

In the operation of such an assembly, such as upon the sensing of a collision, an electrical signal is sent to the initiator device 482. The initiator device 482 will, in turn cause the supplemental fuel source material to release the supplemental fuel into the combustion chamber 460 to mix with fuel and oxidant stored therein to form a combustible mixture. The output of initiator device 482 will also serve to ignite the combustible mixture and thereafter operation of such inflator assembly will be similar to the inflator assembly 10, described above.

In practice, supplemental fuel source materials used in the practice of the invention are generally characterized by having the ability to release hydrogen gas or a hydrocarbon-based fuel material or mix, upon exposure to heat. Suitable supplemental fuel source materials for use in the practice of the invention are generally solids and can thus facilitate handling and storage. Suitable supplemental fuel source materials can include one or more metal hydrides and cellulosic materials such as cellulose acetate, methylcellulose, ethylcellulose, and cellulose nitrate. A preferred metal hydride for use is lithium hydride.

In such assembly designs, the supplemental fuel source material can be stored such that it is loosely arranged or tightly packed near or adjacent the ignition device and directly exposed to the exhaust products, including heat, generated or created by the ignition device.

It is to be understood, however, that the supplemental fuel source material can, if desired, be stored in a separate chamber such as a flexible wall container 497, as shown in FIG. 4', in close proximity to the initiator device 482'. As with the above-described fuel bladder design, the use of a flexible wall housing made of a material that is impervious to water yet burns relatively easily can facilitate or minimize the handling of the supplemental fuel source material, particularly for those supplemental fuel source materials that are water sensitive, such as various metal hydrides.

As the presence of hydrogen gas in proper proportions and at selected conditions with a hydrocarbon fuel and oxidant mixture can generally lead to more complete combustion through higher flame temperatures and enhanced flame speed, the use of a supplemental fuel source material such as a metal hydride which releases hydrogen gas can result in an inflator assembly having lower emissions of pollutants, e.g. lower emissions of incomplete combustion products, and resulting in a quicker deployment of the airbag as the enhanced flame speed can reduce the period of time before the gas begins to flow into the airbag.

With such supplemental fuel source materials, fuel is stored in a bound state such that the fuel can not normally be released unless contacted by an energy output of another source, such as an initiator, or subjected to a different environment. As such supplemental materials can provide a significant proportion of the fuel requirements for the inflator assembly, the relative amount of fuel required to be stored in the combustion chamber in mixture with the oxidant can be significantly reduced and, in turn, problems associated with the long-term storage of such fuel/oxidant mixtures (e.g., autoignition) can also be desirably reduced. Consequently, such use and inclusion of a supplemental fuel source material in inflator assemblies wherein fuel and oxidant can mix during storage can help ensure that such fuel-oxidant mixture can safely be stored for extended periods of time.

It is to be appreciated that the sealing means used in the practice of the invention can include means that are pressure sensitive as well as means that are pressure independent, such as rely on a mechanical means such as a projectile to effect rupture of a disc, for example. Further, assemblies can be made so as to include one or more sealing means which is pressure sensitive and/or one or more sealing means that is pressure independent.

For example, upon the use of a pressure sensitive sealing means, such as a rupture disc designed to rupture at a selected pressure, for the combustion chamber, the combustion of the fluid fuel and the oxidant therein results in an increase in the pressure within the chamber. When the chamber pressure exceeds the rupture pressure of the disc, the disc will rupture to permit the passage of the combustion products through the resulting opening.

Similarly, upon the use of a pressure sensitive sealing means, such as a rupture disc designed to rupture at a selected pressure, for sealing exit from the storage chamber (such as within the diffuser assembly), the mixing of the expelled hot combustion gas with the pressurized stored gas in the chamber to produce inflation gas also results in an increase in the pressure within the chamber. When the chamber pressure exceeds the rupture pressure of the disc, the disc will rupture to permit the passage of the inflation gas from the chamber to inflate the inflatable safety device.

Figure 5B:
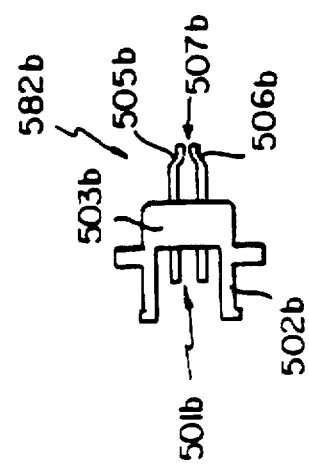
Figure 5A:
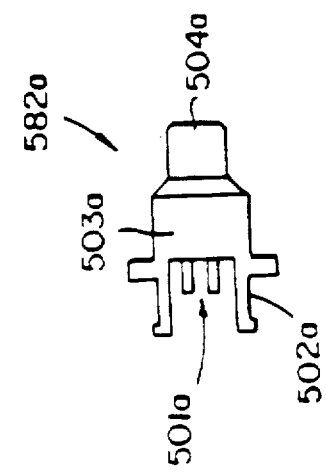

Each of FIGS. 5A, 5B, and 5C are simplified schematic drawings of alternative initiator devices (582a, 582b, and 582c, respectively), such as are known in the art and as can be used in a fluid fueled inflator in accordance with the invention.

The initiator device 582a, illustrated in FIG. 5A, is a pyrotechnic initiator and, as is known, includes an electrical pin connection 501a, a connector 502a, a body portion 503a and a pyrotechnic charge-containing portion 504a.

In the typical operation of such a pyrotechnic initiator, upon the receipt of a proper electrical signal, electric current is passed through a small wire in contact with the pyrotechnic charge housed within the initiator. The heat generated by the passage of the current through the wire causes the pyrotechnic charge to react. Such reaction results in the discharge of heat and radiant particles into the surrounding environment.

It will also be appreciated that in a pyrotechnic initiator, if desired, such a pyrotechnic charge can be ignited by alternative means such as by means of a mechanical primer, for example.

The initiator device 582b, illustrated in FIG. 5B, is a spark discharge initiator and, as is known, includes an electrical pin connection 501b, a connector 502b, a body portion 503b, and first and second electrodes, 505b and 506b, respectively, spaced apart to form a spark gap 507b.

In the typical operation of such a spark discharge initiator, upon the receipt of a proper electrical signal, a high voltage potential is applied across the electrodes of the device. For a given amount of energy, an electric discharge will develop across the electrode gap. In practice, such an amount of energy will be dependent on a number of factors relating to the electrodes including: the characteristics of the surrounding environment, the materials of construction and the geometry thereof, for example. The resulting high energy, high temperature, ionized gas or plasma constituting the region of discharge effectively transfers energy to the surrounding environment, resulting in ignition of the flammable mixture.

The initiator device 582c, illustrated in FIG. 5C, is a heated element initiator and, as is known, includes an electrical pin connection 501c, a connector 502c, a body portion 503c, spaced apart first and second electrodes, 505c and 506c, respectively, joined together by a wire element 508c.

In the typical operation of such a heated element initiator, upon the receipt of a proper electrical signal, electric current is passed through the wire element which is in direct contact with the surrounding environment. Generally, such initiators are commonly designed such that the wire is either suspended above or laying directly on the body of the initiator. The electric current passing through the wire causes the wire to heat rapidly and, dependent on factors such as the dimensions and type of wire, can cause the wire to vaporize. Thus, energy is rapidly transferred to the surrounding media resulting in ignition of the flammable mixture.

As identified above, one aspect of the invention involves an embodiment of the above-described fluid fueled inflator wherein the direction of flow of the hot, generated gas is reversed within the inflator body. Typically, such an inflator apparatus utilize a fuel stored in the form of a fluid such as described above, e.g., a liquid fuel, stored separately from the oxidant.

Figure 6:
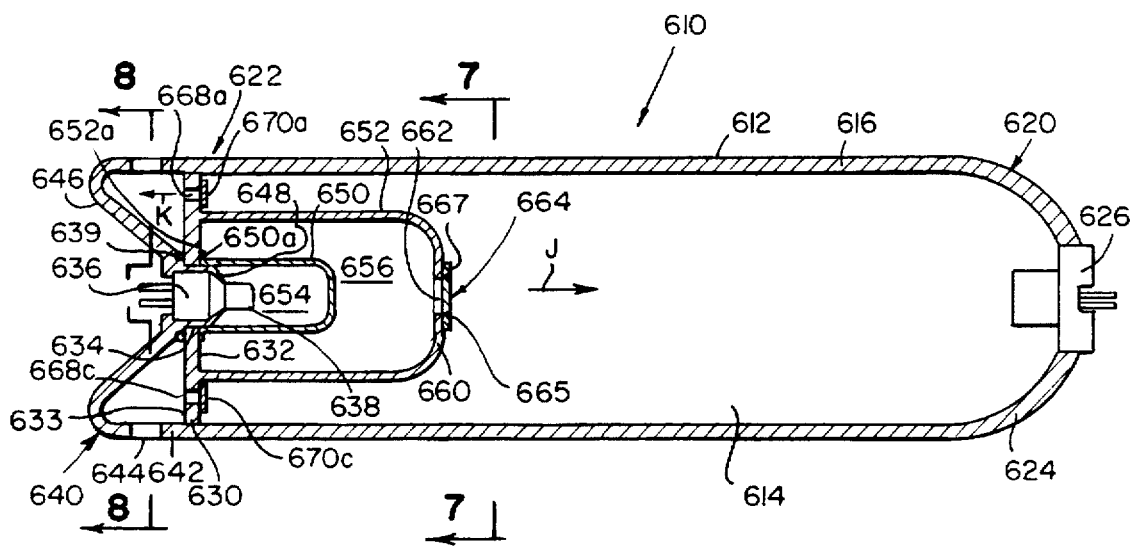
FIG. 6 is a simplified, partially in section schematic drawing of a reverse flow fluid fueled inflator in accordance with one embodiment of the invention.
Figure 7:
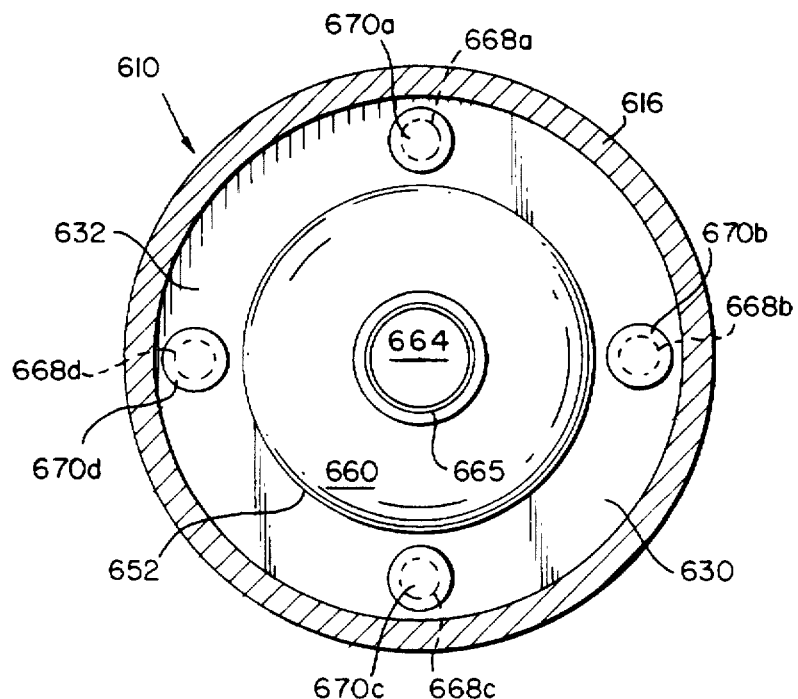
FIGS. 7 and 8 are sectional views taken of FIG. 6, along the lines 7—7 and 8—8, respectively.
Figure 8:
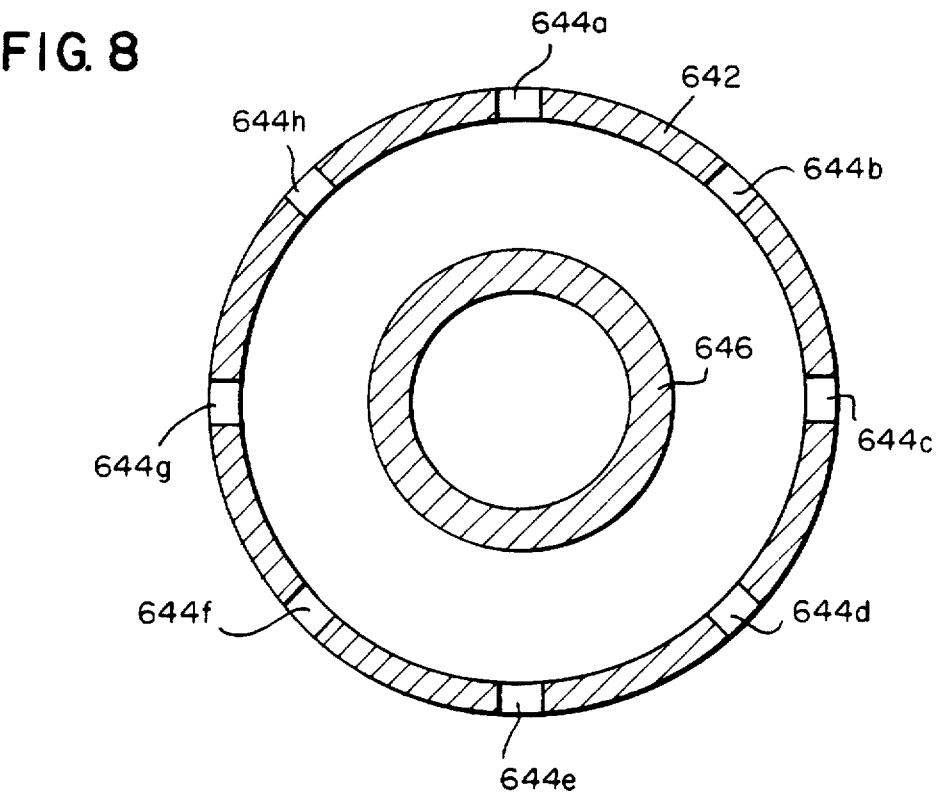

Referring initially to FIGS. 6–8, there is shown a reverse flow fluid fueled inflator assembly, in accordance with one embodiments of the invention and generally designated by the reference numeral 610, for use in inflating a vehicle inflatable restraint cushion for the passenger side of a vehicle. While such a reverse flow fluid fuel inflator assembly of the invention will be described below with reference to an inflator assembly for a passenger side airbag assembly in automotive vehicles including vans, pick-up trucks, and particularly automobiles, it is to be understood that such reverse flow fluid fueled inflator assemblies also have applicability with other types or kinds of airbag assemblies including driver side and side impact airbag assemblies.

As shown in FIG. 6, the inflator assembly 610, similar to the inflator assemblies described above, comprises a pressure vessel 612 including a storage chamber 614 that is filled and pressurized with an inert gas such as argon or nitrogen to a pressure typically in the range of 2000–4000 psi.

The chamber 614 is defined by an elongated tubular or generally cylindrical sleeve 616, having a first and a second end, 620 and 622, respectively. The first end 620 is partially closed by means of an end closure such as including a shoulder portion 624. Such a shoulder portion can be joined to the sleeve 616 or, as shown, be formed in one continuous piece with the sleeve 616. It will be appreciated that such formation as one continuous piece avoids the need for some form of attachment or fastening, such as by a weld, of separate pieces. Such one piece formation can thus reduce manufacturing costs and improve reliability such as through the elimination of a possible leak path from the assembly.

A pressure switch 626, such as is known and commonly referred to as a low pressure sensor ("LPS"), by which the gas pressure in the chamber 614 can be monitored to alert the vehicle occupant should the chamber pressure drop below a predetermined pressure, is attached to the shoulder portion 624, in a manner such as is known in the art, e.g., by means of a circumferential weld (not shown). U.S. Pat. No. 5,296,659, the disclosure of which is herein incorporated, discloses and in FIGS. 3 and 4 shows one type of LPS which can, if desired, be used.

The sleeve second end 622 is partially closed by means of an end closure such as a shoulder portion 630 having an inward facing first side 632 and an outward facing second side 633. Such shoulder portion can be joined to the sleeve 616 or, as shown, be formed in one continuous piece with the sleeve 616.

As described above, part formation in one continuous piece avoids the need for some form of attachment or fastening, such as by a weld, of separate pieces. Such one piece formation can thus reduce manufacturing costs and improve reliability such as through the elimination of a possible leak path from the assembly.

The shoulder portion 630 additionally includes an opening 634 therein, wherethrough an initiator device 636, such as described in greater detail herein and having a discharge end 638, is attached in sealing relation, such as via an O-ring 639.

A diffuser assembly 640 is formed adjacent the outward facing second side 633 of the shoulder portion 630, opposite the chamber 614. The diffuser assembly or the like serves to direct the expelled contents of the storage chamber 614 to an associated inflatable device (not shown). In one preferred embodiment and as illustrated, the diffuser assembly 640 is formed as an extension of the cylindrical sleeve 616 about the second end 622 and includes a side wall portion 642 which generally extends parallel to the sleeve 616 and, as shown in FIG. 8, includes 8 gas discharge openings 644a–h formed therein to permit passage of inflation gas out of the assembly and into the corresponding airbag (not shown).

The diffuser assembly 640 also includes a base wall segment 646 and an initiator retainer 648. The base wall segment 646 joins the diffuser assembly side wall portion 642 to the integral shoulder portion 630 of the sleeve 616. The initiator retainer 648 holds or retains the initiator device 635 within the opening 634. It is to be understood that the initiator device 635 can be crimped, welded or otherwise suitably joined or fastened in or to the assembly.

In the embodiment illustrated in FIG. 6, the initiator retainer 648 is crimped about the initiator device 635 within the opening 634. Specifically, the initiator device 635 is pressed into place with the thin metal retainer 648 folded or bent into position thereover. If desired, an O-ring or other suitable seal (not shown) can be added, as desired, between the adjacent surfaces of the initiator device 635 and the retainer 648 to prevent unwanted possible leakage during functioning of the inflator.

The assembly 610 additionally includes, housed within the sleeve 616, a first or inner generally cup-shaped wall 650 and a second or outer generally cup-shaped wall 652. Each of the cup-shaped walls 650 and 652, respectively, include an open mouth 650a and 652a, respectively. The cup-shaped walls 650 and 652, respectively, are each joined or attached to the shoulder portion 630, such as at the mouth 650a and 652a, respectively, along the inward facing side 632.

Thus, the inner cup-shaped wall 650 is positioned in sealing relationship about the discharge end of the initiator device 638, to define a chamber 654. The fuel chamber 654, similar to the fuel chamber 287 of FIG. 2, permits the storage therein of one or more fuel materials in the form of a fluid, such as described above, with the fuel stored separate and apart from the combustion oxidant which is preferably stored outside thereof. For example, such fuel material can desirably be in the form of a gas, liquid or finely divided solid.

The outer cup-shaped wall 652 is in surrounding relationship with the fuel chamber 654 and defines a combustion chamber 656, with the fuel chamber 654 desirably radially centered within the combustion chamber 656. As such, radially centered arrangements can reduce the number of alignment and positioning maneuvers required in manufacture and production, such arrangements can facilitates and reduce the costs associated therewith.

As shown, the outer cup-shaped wall 652 includes a base portion 660 having a gas exit opening 662 therein. The gas exit opening 662 is normally closed by sealing means, e.g., by means of a pressure sensitive rupture disc 664 joined in sealing relationship with the combustion chamber wall 652, such as by means of a circumferential weld (not shown) about the periphery of the disc 664.

As shown in FIG. 7, the rupture disc 664 can, if desired, be pre-weakened, such as by the inclusion of a score 665 on the outer surface 667 thereof (shown in the form of a circular score). The inclusion of such pre-weakening helps facilitate and better ensure that such sealing discs of corresponding assemblies will, under similar operating conditions, including pressure thereagainst, generally rupture or open in a consistent or predictable manner.

As perhaps best seen by reference to FIG. 7, the shoulder portion 630 additionally includes multiple outlet openings, specifically four outlet opening 668a–d for passage of inflation gas from the storage chamber 614 into the diffuser assembly 640. The openings 668a–d are normally closed by sealing means, e.g., by means of pressure sensitive rupture discs 670a–d such as joined in sealing relationship with the inward facing first side 632 of the shoulder portion 630, in a manner such as is known in the art, e.g., by means of a circumferential weld (not shown). It is to be understood, however, that alternative suitable means and techniques of joinder or attachment, such as by means of bonding or gluing, can if desired be utilized.

The assembly inclusion of 2 or more outlet openings is believed particularly advantageous. For example, should one of the outlet openings become clogged or otherwise unusable for some reason, one or more additional outlet openings would remain available to relieve gas pressure, thus avoiding the possibility of excess pressure build-up within the inflator.

The inclusion of multiple outlet openings also increases design flexibility. For example, with multiple outlet openings, one or more particular outlet openings can to be appropriately sized differently to permit desired different amounts of gas to flow therethrough.

Further, such differently sized outlet openings can be utilized to allow different pressures to affect opening of the associated sealing means for the respective outlet openings. For example, for a sealing means comprising a layer of rupture material of constant thickness and with circular outlet openings, the opening pressure would change with the diameter of the underlying opening. In such case, opening of the rupture material overlying large diameter openings would commonly occur at a lower opening pressure than required for opening of the rupture material overlying relatively smaller diameter openings.

Additionally, various of the rupture discs 670a–d can be specifically designed (such as through material selection, thickness, and strength) to rupture or otherwise open upon the application of a different amount of pressure thereagainst. Thus, the inflation gas exit area from the storage chamber and thus the rate at which inflation gas exits the storage chamber can be tailored to the particular inflation needs required under specific operating conditions.

For example, a disc having a relatively low rupture pressure placed over a relatively small outlet opening can be utilized to permit an early release of a small amount of gas to facilitate the early stages of airbag deployment. Such early release of gas is generally considered advantageous as, for example, such early release can permit either or both an earlier start to or lengthened time period for deployment of an associated airbag.

In the operation of such an assembly, such as upon the sensing of a collision, an electrical signal is sent to the initiator device 636. In such an assembly, the initiator device will preferably be of a pyrotechnic type.

As has been described in greater detail elsewhere herein, pyrotechnic initiator devices can: 1) advantageously provide sufficient energy output to rupture the separation means separating the fuel from the oxidant, 2) adequately disperse and vaporize the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge into the fuel storage chamber 654. In turn, the temperature and pressure of the fuel stored within the fuel storage chamber 654 will increase.

When the gas pressure within the fuel storage chamber 654 exceeds the structural capability of the fuel storage chamber wall 650, the wall ruptures or otherwise permits the passage of the hot fuel into the combustion chamber 656. In the combustion chamber 656, the hot fuel mixes with oxidant and ignites and burns at an elevated temperature and pressure to produce combustion products including hot combustion gas.

When the gas pressure within the combustion chamber 656 exceeds the structural capability of the rupture disc 664, the disc ruptures or otherwise permits the passage of the hot gas through the gas exit opening 662 and into the storage chamber 614 in generally a first direction, generally represented by the arrow designated J. As a result, the hot combustion gas expelled from the combustion chamber 656 mixes with pressurized gas stored within the storage chamber 614 to produce inflation gas for use in inflating the inflatable device, e.g., an airbag. As described above, such an inflator assembly is free of solid particulate material.

The storage chamber 614 is adapted to open when a predetermined increase in pressure within the chamber 614 is realized. Thus, in the embodiment of FIGS. 6–8, when after the mixing of hot combustion gas expelled from the combustion chamber 656 with the gas stored in the storage chamber 614, the gas pressure within the storage chamber 614 exceeds the structural capability of the rupture discs 670a–d, the discs rupture or otherwise permit the passage of at least a portion of the inflation gas through the openings 668a–d in generally a second direction, generally represented by the arrow designated K, into the diffuser assembly 640. As the arrow K is substantially along the same axis but in a direction opposite to the arrow J, that is at least the bulk portion of the flow or passage of the inflation gas through the openings 668a–d streams is substantially along the same axis but in an opposite direction (e.g., substantially a 180° change in direction) to the hot gas passing through the gas exit opening 662 and into the storage chamber 614. In practice, such flow reversal within the inflator assembly of the invention typically will produce improved mixing by and between the hot gases generated within the inflator and the compressed gas stored therein, as well as increased residence for the generated gases, resulting in improved temperature uniformity in the inflation gas exiting the inflator assembly.

The inflation gas exiting from the storage chamber 614, in turn, then passes through the diffuser assembly 640 and specifically the discharge openings 644 thereof and into the airbag assembly (not shown).

It will be appreciated that such an inflator design relies on counterflow, that is the inflation gas is expelled from the chamber 614 in a generally counterflow manner in relation to the hot combustion gas expelled from the combustion chamber 656.

Further, an inflator of such design is in single ended form in that the means by which the combustible material is initiated and the outlet openings by which the inflation gas is vented therefrom are present at the same end of the inflator assembly. As a result, such design more easily allows for the incorporation or inclusion of a pressure sensing device, such as a low pressure sensor or switch in the end of the assembly opposite the initiation means and outlet openings, thereby facilitating the monitoring of pressure within the stored gas chamber, e.g., storage chamber 614.

Also, such a single ended inflator assembly is generally simplified, as compared to typical opposite ended inflator assemblies, e.g., an inflator assembly having initiation means and exit port at opposite ends thereof. For example, such a single ended inflator assembly can be fabricated with a fewer number of welds, as compared to a comparable welded opposite ended inflator assembly.

Figure 9:
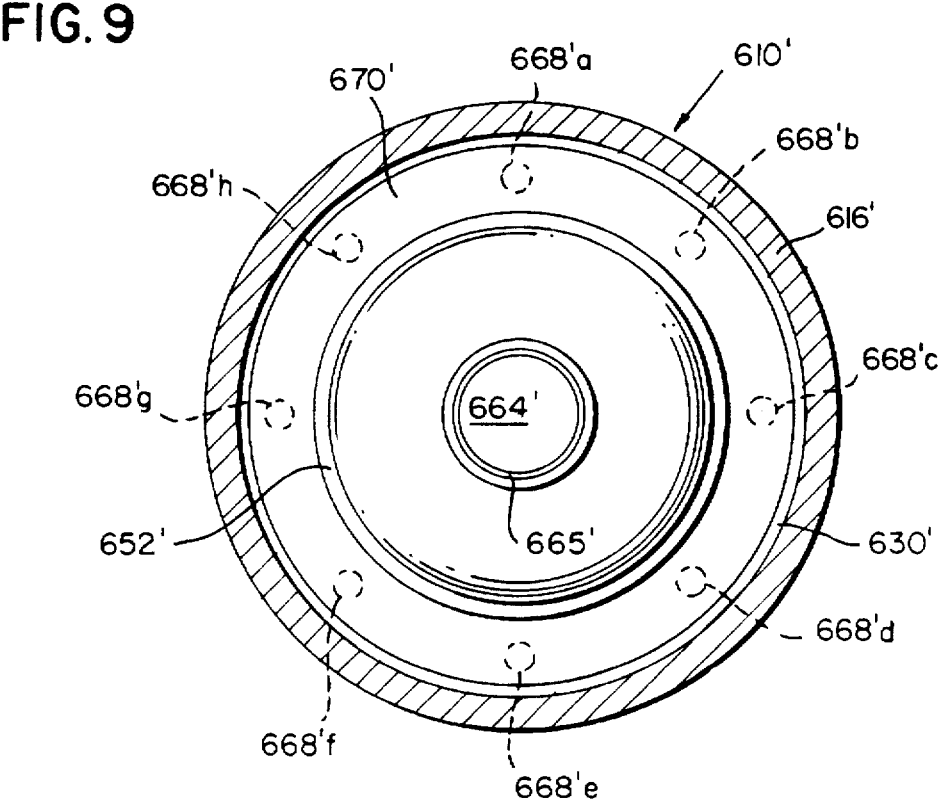
FIGS. 9 and 10 are sectional views, taken along the line 7—7 of FIG. 6, in accordance with alternative embodiments of the invention.
Figure 10:
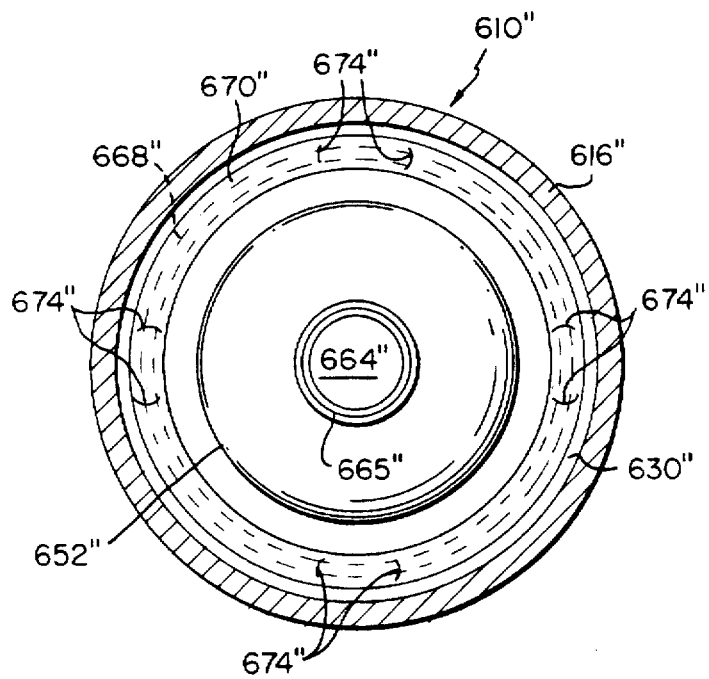

FIGS. 9 and 10 are sectional views, generally similar to the sectional view shown in FIG. 7, in accordance with alternative embodiments of the invention. Specifically, FIG. 9 illustrates an inflator assembly 610' generally similar to the inflator assembly 610 described above and including a cylindrical sleeve 616', a shoulder portion 630', an outer cup-shaped wall 652', and a rupture disc 664' with a score 665'. The inflator assembly 610', however, rather than having 4 outlet openings, includes 8 outlet openings 668'a–h in the shoulder portion 630' and, wherein rather than an individual rupture disc for each opening, utilizes a single rupture disc element 670' placed in covering relationship with the openings 668'a–h.

It is to be understood that such utilization of a single rupture disc element for associated multiple outlet openings can facilitate manufacture and design. For example, improved repeatability of rupture characteristics can be realized with the use of such a single rupture disc element as compared to the use of corresponding separate rupture discs.

It will be appreciated that such single rupture disc element can, for example, be fabricated of common rupture disc material such as low carbon steel or aluminum, as desired, to result: in desired performance in operation.

FIG. 10 illustrates an inflator assembly 610" generally similar to the inflator assembly 610' described above and including a cylindrical sleeve 616", a shoulder portion 630", an outer cup-shaped wall 652", a rupture disc 664" with a score 665", and a rupture disc element 670". The inflator assembly 610", however, rather than having 2 or more preformed generally circular outlet openings, includes an annular outlet ring 668", formed in the shoulder portion 630". The rupture disc element 670" is placed in covering relationship to annular outlet ring 668" and includes weakened or scored segments 674" designed to rupture or appropriately give way at predetermined operating conditions (e.g. upon application of a predetermined selected pressure thereagainst to form gas passage openings therein), permitting the passage of inflation gas therethrough. It is to be appreciated that such an assembly can facilitate manufacture, for example, the shoulder portion 630" can be simply made of uniform thickness with a single annular outlet ring formed therein.

Figure 11:
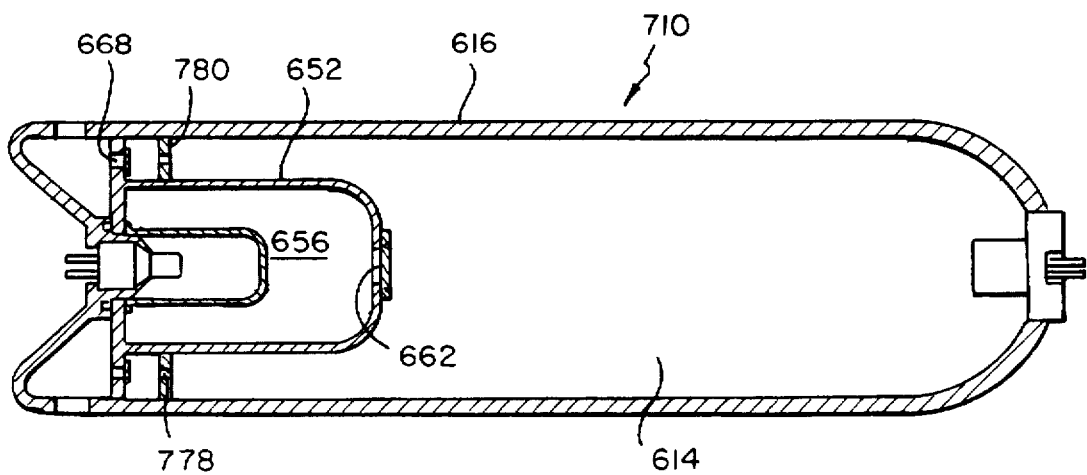
FIG. 11 is a simplified, partially in section schematic drawing of the reverse flow fluid fueled inflator of FIG. 6 modified to include throttling orifices upstream of the gas outlet opening(s) of the stored gas chamber of the inflator.

FIG. 11 illustrates a reverse flow fluid fueled inflator assembly 710 generally similar to the reverse flow inflator assembly 610 described above relative to FIGS. 6–8 and wherein like components are similarly numbered. The inflator assembly 710, however, differs from the previously described assembly 610 in at least one significant aspect: the assembly 710 includes four throttling orifices 778 (only two of which are shown) interposed between the four outlet openings 668 (only two of which are shown) of or from the stored gas chamber 614 and the gas exit opening 662 of the combustion chamber 656, on the gas flow path between the gas exit opening 662 and the outlet openings 668. Specifically, the throttling orifices 778 are formed in an annular ring 780 placed in sealing relationship about the outer cup-shaped wall 652 and between the wall 652 and the cylindrical sleeve 616.

It will be appreciated that such inclusion of throttling orifices upstream of the outlet openings can provide certain operational advantages. For example, such inflator assemblies can advantageously be utilized where the gas flow through area of one or more of the outlet openings becomes obstructed such as by the associated sealing means, e.g., a burst disc. failing to open completely or otherwise blocking or clogging the outlet opening(s). With inflators of such design and provided that the gas flow through area provided as a result of the opening of one or more of the outlet openings is greater than the flow through area provided by the throttling orifices, the inflation gas flow rate from the inflator through the outlet openings will generally not be affected by such outlet opening obstruction.

Further, it is to be appreciated that the number as well as the location and placement of such throttling orifices can be specifically varied as desired to achieve desired flow results. In practice, where a generally even gas flow distribution is frequently desired, such an assembly preferably will include two or more such throttling orifices, preferably generally evenly spaced from adjacent throttling orifice(s).

Figure 12:
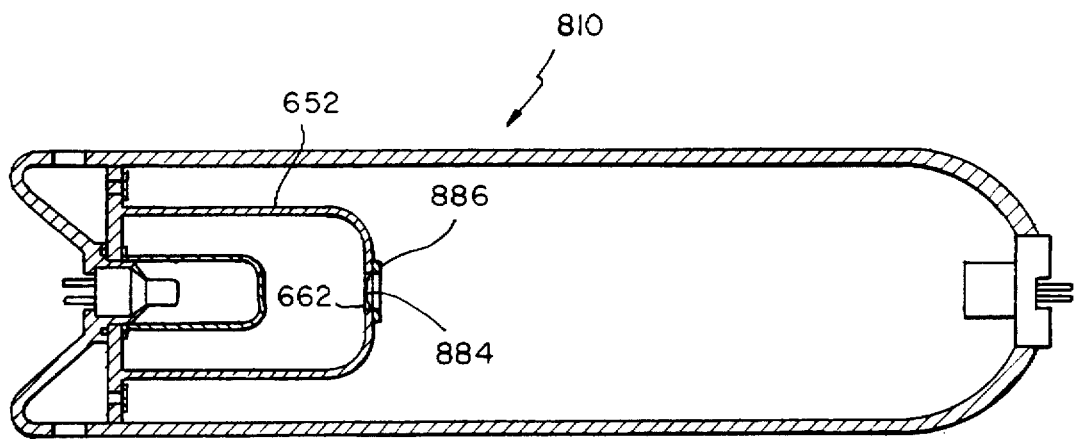
FIG. 12 is a simplified, partially in section schematic drawing, similar to that of FIG. 6, of a reverse flow fluid fueled inflator in accordance with an alternative embodiment of the invention wherein the gas exit opening of the first or combustion chamber of the inflator is normally closed by means of a reversing burst disc.

FIG. 12 illustrates a reverse flow fluid fueled inflator assembly 810 generally similar-to the reverse flow inflator assembly 610 described above relative to FIGS. 6–8 and wherein like components are similarly numbered. The inflator assembly 810, however, differs from the previously described assembly 610 in at least one significant aspect: the assembly 810 includes a reversing burst disc 884. e.g., a burst disc which in the static condition has a high pressure side and a low pressure side and which in operation is designed to rupture towards what was the static state high pressure side, as the sealing means whereby the gas exit opening 662 is normally closed. As shown, such a reversing burst disc can be joined in sealing relationship with the combustion chamber wall 652 such as by means of a retainer 886.

As it is generally accepted that the rupture characteristics of reversing burst discs are more repeatable than standard burst discs, more consistent performance may be obtainable with designs which utilize such reversing burst discs.

It is also to be appreciated that such inclusion of a retainer can improve performance reliability. For example, direct welding of a relatively thin rupture disc to the comparatively thick combustion chamber wall can prove difficult to properly accomplish and could result, upon functioning of the inflator, in the unreliable failure of the weld rather than of the burst disc material.

Figure 13:
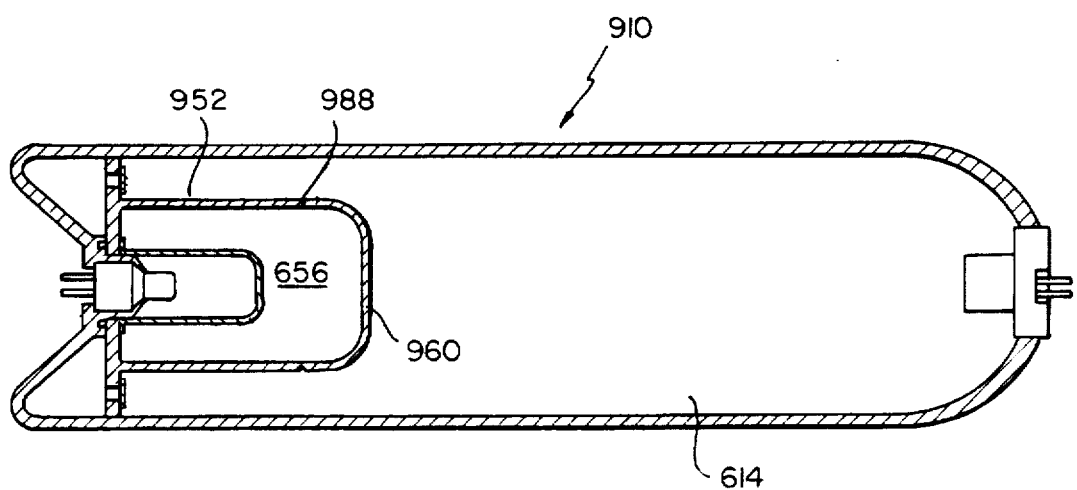
FIG. 13 is a simplified, partially in section schematic drawing, similar to that of FIG. 6, of a reverse flow fluid fueled inflator in accordance with an alternative embodiment of the invention wherein the first or combustion chamber of the inflator is scored or otherwise fracturable to permit fluid communication of gases formed therein with gases contained in the second or stored gas chamber.

FIG. 13 illustrates a reverse flow fluid fueled inflator assembly 910 generally similar to the reverse flow inflator assembly 610 described above relative to the embodiments FIGS. 6–8 and 12, respectively, but rather than a gas exit opening in the combustion chamber closed by means of a rupture disc 664 (FIGS. 6–8) or a reversing burst disc 884 (FIG. 12) includes a combustion chamber wall 952 selectively preweakened, scored or otherwise fracturable, e.g., such as by the inclusion of a score line 988 of reduced wall thickness. As a result, the combustion chamber wall 952 is adapted to open when a predetermined increase in pressure within the combustion chamber 656 is realized to permit fluid communication of gases formed in the combustion chamber with gases contained in the storage chamber.

It is to be understood that this aspect of the invention in its broader terms can be practiced with the combustion chamber wall 952 being selectively preweakened, scored or otherwise fracturable where desired along the span of the wall, including along the base portion 960. In practice, the specific site or location of such selective preweakening or the like will be selected to produce or result in the desired area for venting from the combustion chamber 656 to the storage chamber 614.

An inflator assembly of such design can, for example, advantageously: reduce the costs associated with manufacture and production (e.g., reduce the number of parts required); improve reliability (e.g., eliminate one or more possible leak paths) and simplify manufacture (e.g., reduce the number of joints or welds).

In view of the above, it is to be appreciated that the reverse flow fluid fueled inflator assembly of the invention described herein can, for example, afford a number of advantages such as providing:

a) greater operational flexibility, thereby better permitting a particular inflator to be more easily designed to meet the specific inflation gas needs in particular vehicular applications;

b) improved contact and mixing by and between generated gas and stored gas, such as resulting in improved heat transfer therebetween and thereby more conducive to an inflator of compact design; and c) an inflator design which can be assembled more simply, easily and less costly.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art. Consistent therewith, appearances of mean-plus-function clauses in the claims are intended to cover not only structural equivalents but also equivalent structures. For example, although a nail and a screw may not be considered equivalent structures in that a nail employs a cylindrical surface to secure parts together, whereas a screw employs a helical surface, in the environment of part fastening, a nail and a screw may be equivalent structures.

What is claimed is:

1. An apparatus for inflating an inflatable device, said apparatus comprising:

a housing containing at least one fuel in the form of a fluid and at least one oxidant, said housing including a first chamber wherein the at least one fuel and the at least one oxidant are burned to produce combustion products including hot combustion gas, said first chamber adapted to open when a predetermined increase in pressure within said first chamber is realized, whereby at least a portion of the hot combustion gas is expelled from said first chamber in a first direction, initiator means for initiating the burning of the at least one fuel and at least one oxidant in said first chamber, said housing also including a second chamber containing a supply of pressurized stored gas, said second chamber having at least one outlet opening with sealing means normally closing said at least one outlet opening and being in fluid communication with said first chamber upon the opening of said first chamber with the hot combustion gas expelled from said first chamber mixing with the pressurized stored gas to produce inflation gas free of solid particulate material, said sealing means normally closing said at least one outlet opening adapted to open when a predetermined increase in pressure within said second chamber is realized after the hot combustion gas expelled from said first chamber mixes with the pressurized stored gas to produce the inflation gas, whereby at least a portion of the inflation gas is expelled from said second chamber in a second direction, and wherein the inflation gas is expelled from said second chamber in a counterflow manner in relation to the hot combustion gas expelled from said first chamber.

2. The apparatus of claim 1 additionally comprising directing means for directing the expelled second chamber contents to the inflatable device.

3. The apparatus of claim 1 wherein said first chamber is formed at least in part by a wall having a preweakened section adapted to fail when a predetermined increase in pressure within said first chamber is realized, whereby said first chamber is opened with the at least a portion of the hot combustion gas expelled from said first chamber in the first direction.

4. The apparatus of claim 1 wherein said first chamber includes at least one gas exit opening and has sealing means normally closing the at least one gas exit opening.

5. The apparatus of claim 4 wherein said gas exit opening sealing means comprises a rupture disc.

6. The apparatus of claim 4 wherein said gas exit opening sealing means comprises a reversing burst disc.

7. The apparatus of claim 4 wherein said gas exit opening sealing means comprises a disc preweakened to facilitate opening at specified operating conditions including pressure thereagainst.

8. The apparatus of claim 1 wherein said second chamber includes at least two gas outlet openings and has gas outlet sealing means normally closing said at least two gas outlet openings.

9. The apparatus of claim 8 wherein said gas outlet sealing means is pressure sensitive.

10. The apparatus of claim 8 wherein said gas outlet sealing means comprises a single rupture disc element for at least two of said at least two gas outlet openings.

11. The apparatus of claim 8 wherein said gas outlet sealing means comprises a single rupture disc element for all of said gas outlet openings.

12. The apparatus of claim 1 including a low pressure sensing device to monitor pressure within said second chamber.

13. The apparatus of claim 1 wherein upon opening of said first chamber said first chamber includes a gas exit opening and wherein upon opening of said second chamber said second chamber includes at least two gas outlet openings with a gas flow path between the gas exit opening and the gas outlet openings, said apparatus further comprising at least two throttling orifices interposed between the gas exit opening and the gas outlet openings on the gas flow path.

14. The apparatus of claim 1 wherein said first chamber is radially centered within said second chamber.

15. The apparatus of claim 1 wherein the fluid form of the at least one fuel is gaseous.

16. The apparatus of claim 1 wherein the fluid form of the at least one fuel is liquid.

17. The apparatus of claim 1 wherein the fluid form of the at least one fuel is finely divided solid.

18. The apparatus of claim 1 in an elongated form having a first and a second end wherein said initiator means and said at least one outlet opening are at the same end.

19. An apparatus for inflating an inflatable device, said apparatus comprising:

an elongated tubular housing containing at least one fuel in the form of a fluid and at least one oxidant, said housing having first and second end portions, the first end portion closed by means of a first end closure and the second end portion closed by means of a second end closure, said housing including a first chamber along at least a first section of the second end closure and formed at least in part by a wall, wherein the at least one fuel and the at least one oxidant are burned to produce combustion products including hot combustion gas, the combustion of the fuel in the form of a fluid and the oxidant increasing the temperature and pressure within said first chamber with said first chamber adapted to open when a predetermined increase in pressure within said first chamber is realized, whereby at least a portion of the hot combustion gas is expelled from said first chamber in a direction opposite the first section of the second end closure, initiator means for initiating the burning of the at least one fuel and at least one oxidant in said first chamber, said housing also including a second chamber along at least a second section of the second end closure, said second chamber including at least one outlet opening at the second section of the second end closure and sealing means normally closing said at least one outlet opening, said second chamber containing a supply of pressurized stored gas and being in fluid communication with said first chamber upon the opening of said first chamber, the hot combustion gas expelled from said first chamber mixing with the pressurized stored gas to produce inflation gas free of solid particulate material, the mixing of the hot combustion gas with the pressurized stored gas increasing the temperature and pressure within said second chamber with said second chamber sealing means adapted to open when a predetermined increase in pressure within said second chamber is realized after the hot combustion gas expelled from said first chamber mixes with the pressurized stored gas to produce the inflation gas, whereby at least a portion of the inflation gas is expelled from said second chamber through said at least one outlet opening, and directing means for directing the expelled second chamber contents to the inflatable device.

20. The apparatus of claim 19 wherein said initiator means is at said second end closure.

21. The apparatus of claim 19 wherein said second chamber is bordered at one end by said first end closure.

22. The apparatus of claim 21 wherein said second chamber one end bordered by said first end closure includes a low pressure sensing device to monitor pressure within said second chamber.

23. The apparatus of claim 22 wherein the low pressure sensing device is at one end of said apparatus and the initiator means is at an opposing end of said apparatus.

24. A method for inflating an inflatable safety device in a vehicle, said method utilizing an apparatus having a first sealed chamber wherein a fuel is burned and a second chamber containing a supply of pressurized stored gas, the second chamber having at lest one outlet opening and sealing means normally closing the at least one outlet opening, said method comprising the steps of:

burning at least one fuel in the form of a fluid with at least one oxidant in the first sealed chamber to produce combustion products including hot combustion gas and thereby increasing the temperature and pressure within the first chamber;

opening the first chamber when a predetermined increase in the pressure within the first chamber is realized to expel at least a portion of the hot combustion gas from the first chamber into the second chamber containing the supply of pressurized stored gas;

mixing the expelled hot combustion gas with the pressurized stored gas in the second chamber to produce inflation gas free of solid particulate material, said mixing increasing the temperature and pressure within the second chamber, and opening the sealing means normally closing the at least one outlet opening of the second chamber when a predetermined increase in the pressure within the second chamber is realized to expel the inflation gas from the second chamber to inflate the inflatable safety device;

wherein the hot combustion gas expelled from the first chamber and mixing with the pressurized stored gas to produce the inflation gas in the second chamber undergoes a reversal of direction between exiting the first chamber and exiting the second chamber.

25. The method of claim 24 wherein the fluid form of the at least one fuel is gaseous.

26. The method of claim 24 wherein the fluid form of the at least one fuel is liquid.

27. The method of claim 24 wherein the fluid form of the at least one fuel is finely divided solid.

28. An apparatus for inflating an inflatable device, said apparatus comprising:

a housing including a first chamber wherein at least one fuel in the form of a fluid and at least one oxidant are burned to produce combustion products including hot combustion gas, said first chamber adapted to open when a predetermined increase in pressure within said first chamber is realized, whereby at least a portion of the hot combustion gas is expelled from said first chamber in a first direction, initiator means for initiating the burning of the at least one fuel and at least one oxidant in said first chamber, said housing also including a second chamber containing a supply of pressurized stored gas, said second chamber having at least two gas outlet openings and gas outlet sealing means comprising a separate rupture disc for each of said at least two gas outlet openings normally closing each of said at least two gas outlet openings, said second chamber in fluid communication with said first chamber upon the opening of said first chamber with the hot combustion gas expelled from said first chamber mixing with the pressurized stored gas to produce inflation gas, said second chamber adapted to open when a predetermined increase in pressure within said second chamber is realized after the hot combustion gas expelled from said first chamber mixes with the pressurized stored gas to produce the inflation gas, whereby at least a portion of the inflation gas is expelled from said second chamber in a second direction, and wherein the inflation gas is expelled from said second chamber in a counterflow manner in relation to the hot combustion gas expelled from said first chamber.

29. An apparatus for inflating an inflatable device, said apparatus comprising:

a housing including a first chamber wherein at least one fuel in the form of a fluid and at least one oxidant are burned to produce combustion products including hot combustion gas, said first chamber adapted to open when a predetermined increase in pressure within said first chamber is realized, whereby at least a portion of the hot combustion gas is expelled from said first chamber in a first direction, initiator means for initiating the burning of the at least one fuel and at least one oxidant in said first chamber, said housing also including a second chamber containing a supply of pressurized stored gas, said second chamber having at least two gas outlet openings and pressure sensitive gas outlet sealing means normally closing said at least two gas outlet openings, said second chamber in fluid communication with said first chamber upon the opening of said first chamber with the hot combustion gas expelled from said first chamber mixing with the pressurized stored gas to produce inflation gas, said second chamber adapted to open when a predetermined increase in pressure within said second chamber is realized after the hot combustion gas expelled from said first chamber mixes with the pressurized stored gas to produce the inflation gas, whereby at least a portion of the inflation gas is expelled from said second chamber in a second direction, wherein the inflation gas is expelled from said second chamber in a counterflow manner in relation to the hot combustion gas expelled from said first chamber, and wherein a first of said at least two outlet openings is selectively opened at a lesser pressure than a second of said at least two outlet openings.

* * * * *